United States Patent
Koshiba et al.

(10) Patent No.: US 8,423,360 B2
(45) Date of Patent: Apr. 16, 2013

(54) SPEECH RECOGNITION APPARATUS, METHOD AND COMPUTER PROGRAM PRODUCT

(75) Inventors: Ryosuke Koshiba, Kanagawa-Ken (JP); Akinori Kawamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1899 days.

(21) Appl. No.: 10/850,105

(22) Filed: May 21, 2004

(65) Prior Publication Data

US 2005/0010406 A1    Jan. 13, 2005

(30) Foreign Application Priority Data

May 23, 2003    (JP) ............................... P2003-146248

(51) Int. Cl.
*G10L 15/20*    (2006.01)

(52) U.S. Cl.
USPC ........................................................ 704/233

(58) Field of Classification Search .................. 704/233, 704/226–228
See application file for complete search history.

(56) References Cited

U.S. PATENT DOCUMENTS

| | | | | |
|---|---|---|---|---|
| 5,742,927 A | * | 4/1998 | Crozier et al. ................ | 704/226 |
| 6,678,657 B1 | * | 1/2004 | Bruckner et al. ............. | 704/240 |
| 7,133,824 B2 | * | 11/2006 | Wu et al. ....................... | 704/226 |
| 2001/0016020 A1 | * | 8/2001 | Gustafsson et al. .......... | 375/346 |
| 2002/0035417 A1 | * | 3/2002 | Badger et al. ................... | 701/19 |
| 2002/0172350 A1 | * | 11/2002 | Edwards et al. ......... | 379/392.01 |
| 2003/0187637 A1 | * | 10/2003 | Kang et al. .................... | 704/226 |

FOREIGN PATENT DOCUMENTS

| | | |
|---|---|---|
| JP | 9-160594 | 6/1997 |
| JP | 2000-330597 | 11/2000 |
| JP | 2001-67094 | 3/2001 |
| JP | 2001-215992 | 8/2001 |

OTHER PUBLICATIONS

Steven F. Boll, "Suppression of Acoustic Noise in Speech Using Spectral Subtraction" IEEE Transactions on Acoustics, Speech, and Signal Processing, vol. ASSP-27, No. 2, Apr. 1979, pp. 113-120.

* cited by examiner

*Primary Examiner* — Angela A Armstrong
(74) *Attorney, Agent, or Firm* — Oblon, Spivak, McClelland, Maier & Neustadt, L.L.P.

(57) ABSTRACT

A speech recognition apparatus, method and computer program product whereby noise is subtracted from an input speech signal by a plurality of spectral subtractions having differing rates of noise subtraction to produce plural noise-subtracted signals, at least one speech features is extracted from the noise-subtracted signals, and the extracted feature is compared with a standard speech pattern obtained beforehand to recognize the speech signal based on a result of the comparison. In addition, features can be extracted from at least one of the noise-subtracted signals and also the input speech signal for comparison with the standard speech pattern. Plural features can be combined into a single feature for the comparison.

3 Claims, 7 Drawing Sheets

SPEECH RECOGNITION APPARATUS, METHOD AND COMPUTER PROGRAM PRODUCT

CROSS-REFERENCE TO RELATED APPLICATIONS

This application is based upon and claims the benefit of priority from the prior Japanese Patent Application No. 2003-146248, filed May 23, 2003, the entire contents of which are incorporated herein by reference.

FIELD OF THE INVENTION

The present invention relates to a speech recognition apparatus, method, and computer program product directed to recognizing speech uttered in a noise environment.

DESCRIPTION OF THE BACKGROUND

There is a problem that environmental noise deteriorates speech recognition performance in a practical environment.

As a method for solving this problem, a spectrum subtraction method has been disclosed in, e.g., S. F. Boll, "Suppression of Acoustic Noise in Speech Using Spectral Subtraction," IEEE Trans. Acoustics, Speech, and Signal Processing, vol. ASSP-27, No. 2, pp. 113-120, 1979. This is a method to reduce the spectral effects of acoustically added noise in speech by subtracting an estimated noise from an input speech.

This method decides a noise subtraction rate with a noise suppression coefficient. The coefficient should be large in order to make the influence of noise smaller, but an unduly large coefficient distorts the subtracted speech and deteriorates the speech recognition performance. The optimal coefficient should be determined according to the amplitude of the added noise. However, the noise amplitude changes frequently in a practical environment, so it is very difficult to determine the optimal coefficient.

In order to solve this problem, the method to vary the noise suppression coefficient according to the SNR between speech and noise is proposed. The method is disclosed in, e.g., Japan Patent Application KOKAI No. 2000-330597.

This method works well, if the environmental noise changes slowly. But there are some bursts of noise like honking horns in a practical environment. In those cases, it becomes very difficult to estimate an accurate SNR and to determine the optimal noise suppression coefficient. An inaccurate noise suppression coefficient could deteriorate the performance of speech recognition.

Thus the conventional methods have a problem of insufficient noise subtraction in a practical environment. That causes a problem not to obtain sufficient speech recognition performance.

SUMMARY OF THE INVENTION

Accordingly, it is an object of the present invention to provide a speech recognition apparatus, method, and program, which ameliorates the problems of the prior art and stabilizes speech recognition even in the face of short term variation noise variation.

According to one aspect of the present invention, there is provided a speech recognition apparatus, method and computer program product whereby noise is subtracted from an input speech signal by a plurality of spectral subtractions having differing rates of noise subtraction to produce plural noise-subtracted signals, at least one speech features is extracted from the noise-subtracted signals, and the extracted feature is compared with a standard speech pattern obtained beforehand to recognize the speech signal based on a result of the comparison. In addition, features can be extracted from at least one of the noise-subtracted signals and also the input speech signal for comparison with the standard speech pattern. Plural features can be combined into a single feature for the comparison.

BRIEF DESCRIPTION OF THE DRAWINGS

The present invention may be more readily described with reference to the accompanying drawings.

DETAILED DESCRIPTION OF THE INVENTION

Referring now to the drawing embodiments of the invention are next described in detail.

First Embodiment

Figure 1:
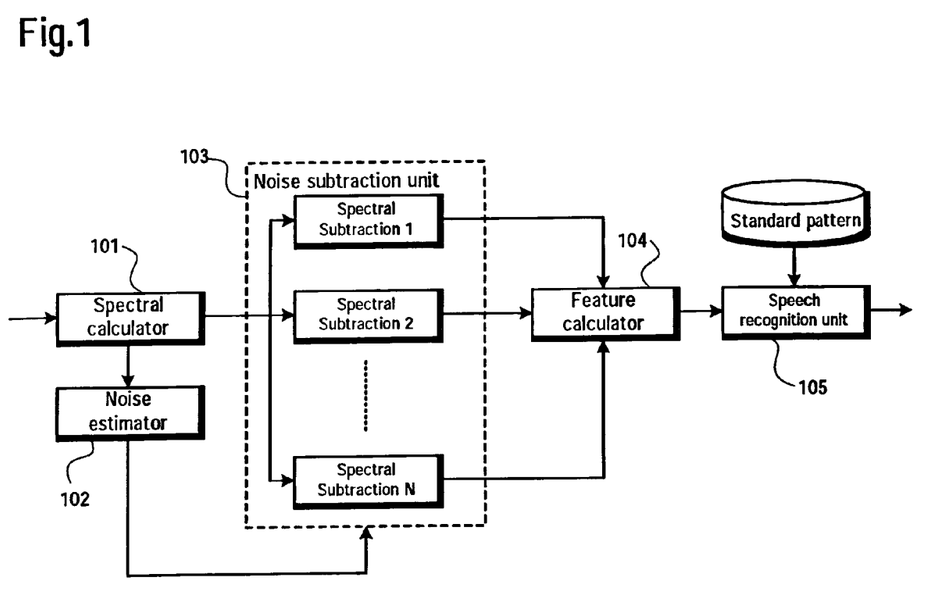
FIG. 1 is a block diagram showing a speech recognition apparatus in an embodiment of the invention.

FIG. 1 is a block diagram showing a speech recognition apparatus of a first embodiment.

As shown in FIG. 1, the speech recognition apparatus has a spectral calculator 101 which calculates a signal spectrum of an inputted speech signal, a noise estimator 102 which estimates a noise spectrum using the signal spectrum calculated by the spectrum calculator 101, a noise subtraction unit 103 which performs a plurality of spectral subtractions at respective differing rates of noise subtraction using the signal spectrum calculated in the spectrum calculator 101 and the noise spectrum estimated in the noise estimator 102, a feature calculator 104 which calculates a feature (vector) for comparison with a speech recognition dictionary of standard patterns learned beforehand by integrating a plurality of the noise-subtracted spectrums obtained from noise subtraction unit 103, and a speech recognition unit 105 which recognizes speech by comparing the speech feature calculated in the feature calculator 104 with the standard pattern learned beforehand and stored in the speech recognition dictionary.

Next, processing of this speech recognition apparatus will be described. The spectrum calculator 101 changes an inputted speech signal time series into a frequency spectrum by frequency analysis, and outputs the frequency spectrum.

The noise estimator 102 observes signal amplitude or electric power of the inputted speech signal, and decides whether the inputted speech signal includes speech. For example, it decides that speech is being inputted, i.e., an utterance state when a signal of large amplitude or large electric power is inputted continuously, as compared with an inputted signal of noise level observed immediately beforehand.

Conversely, it decides the existence of a silent state in which speech is not inputted when the amplitude or electric power of the inputted signal become small, before and after an "utterance period", i.e., a continuous input of signal of large amplitude or large electric power.

The noise estimator 102 estimates a noise spectrum of a signal of a period including only noise when it is decided that the input signal is in the silent state, using the spectrum inputted from the spectrum calculator 101.

The frequency spectrum outputted from the spectrum calculator 101 and the noise spectrum outputted from the noise estimator 102 are inputted into the noise subtraction unit 103 in the silent period.

The noise subtraction unit 103 has a plurality of spectral subtractors that perform noise subtraction at different rates respectively. If the noise spectrum outputted from the spectrum calculator 101 is set to $X(\omega)$, the noise spectrum outputted from the noise estimator 102 is set to $N(\omega)$, each spectrum subtraction, for example, is realized by using the following formula 1.

$$\|S(\omega)\|^2 = \|X(\omega)\|^2 - \alpha\|N(\omega)\|^2 \quad (1)$$

$\| \|$ is a value of spectrum.

The coefficient $\alpha$ is a suppression coefficient, and it is possible to adjust a rate of noise subtraction by changing the value of $\alpha$. Therefore, it is possible to realize a noise subtraction unit which produces a plurality of noise-subtracted spectrums obtained the differing rates of noise subtractions by including a plurality of spectral subtraction units employing respective different suppression coefficients $\alpha$ in the noise subtraction unit 103.

Figure 2:
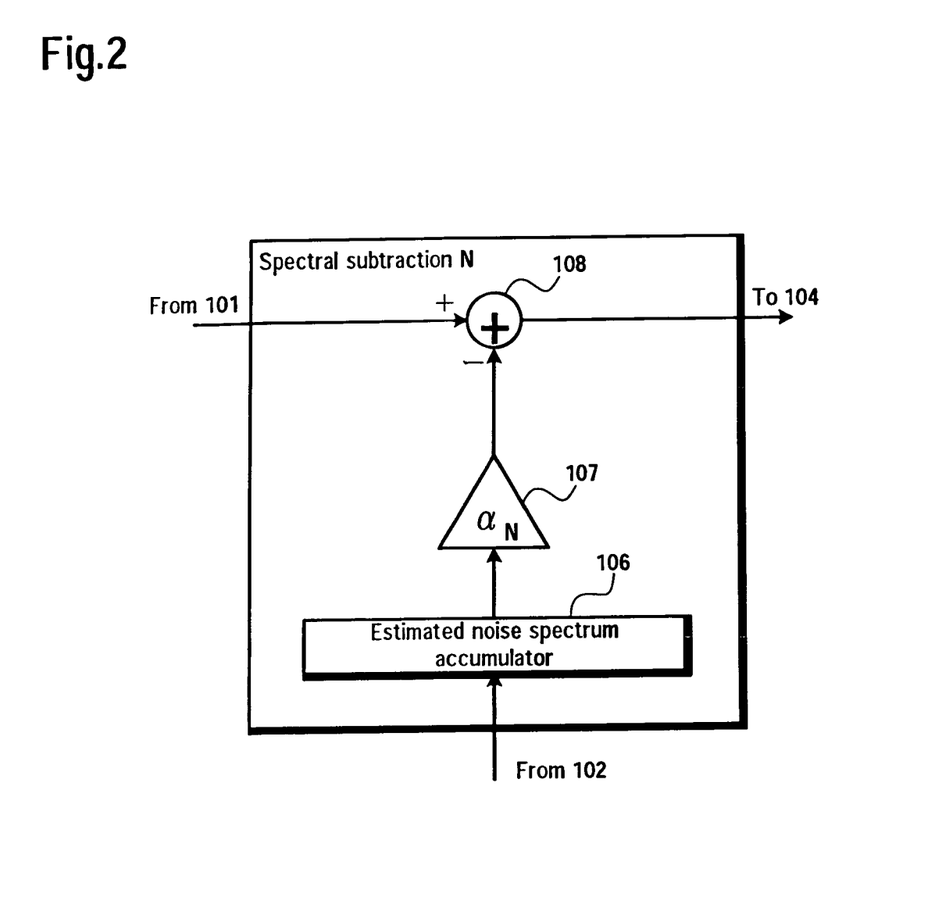
FIG. 2 is a block diagram showing an example of structure of a spectrum subtraction.

An example of a structure of spectral subtraction N is shown in FIG. 2. The noise spectrum obtained in the noise estimator 102 is once accumulated in the noise spectrum accumulator 106. After the noise spectrum is multiplied by the noise suppression coefficient $\alpha_N$ in an amplifier 107, the multiplied noise spectrum is subtracted from the frequency spectrum by a subtractor 108. In this way, the noise-subtracted input signal spectrum is sent to the feature calculator 104.

As an example of the noise suppression coefficient, although generally chosen in range of $0 \leq \alpha \leq 1$, a range of $1 \leq \alpha$ may be chosen for noise suppression. Although, in the above-mentioned example, the noise suppression coefficient is a respective fixed value for each frequency of each spectrum subtraction, it is also possible to change the rate of noise subtraction by changing the noise suppression coefficient according to frequency for each spectral subtraction.

For example, the noise suppression coefficient of the 1st spectral subtraction is $\alpha = 1.0 (\omega < TH)$ $\alpha = 0.0 (\omega \geq TH)$ and, the noise suppression coefficient of the 2nd spectral subtraction is $\alpha = 0.0 (\omega < TH)$ $\alpha = 1.0 (\omega \geq TH)$ By the above noise suppression coefficient, it is possible to set up the rate of noise subtraction according to frequency for each spectral subtraction. Here, "TH" is a suitably defined frequency threshold.

Thus, a plurality of noise subtracted spectrums calculated by the noise subtraction unit 103 are inputted into the feature calculator 104. The feature calculator 104 calculates features for speech recognition by integrating a plurality of the inputted spectrums.

Figure 4:
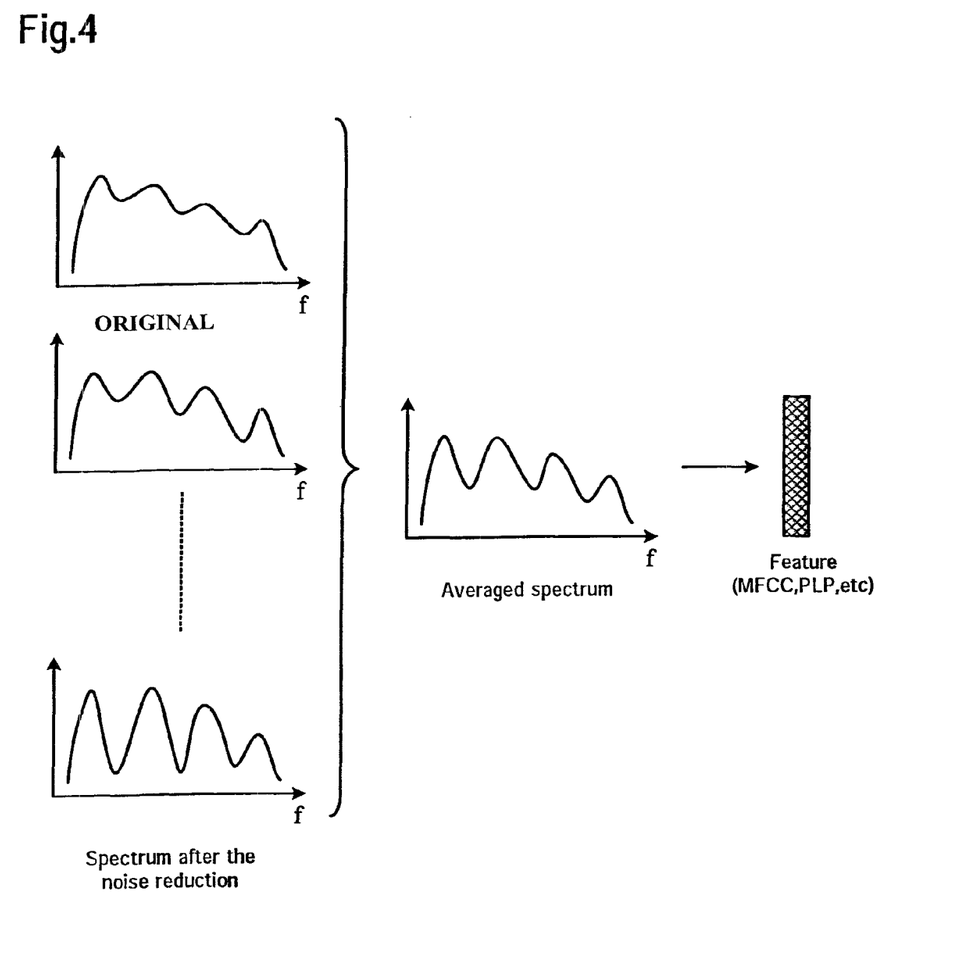
FIG. 4 is an explanatory diagram explaining how to calculate features by averaging a plurality of speech spectrums after noise subtraction.
Figure 5:
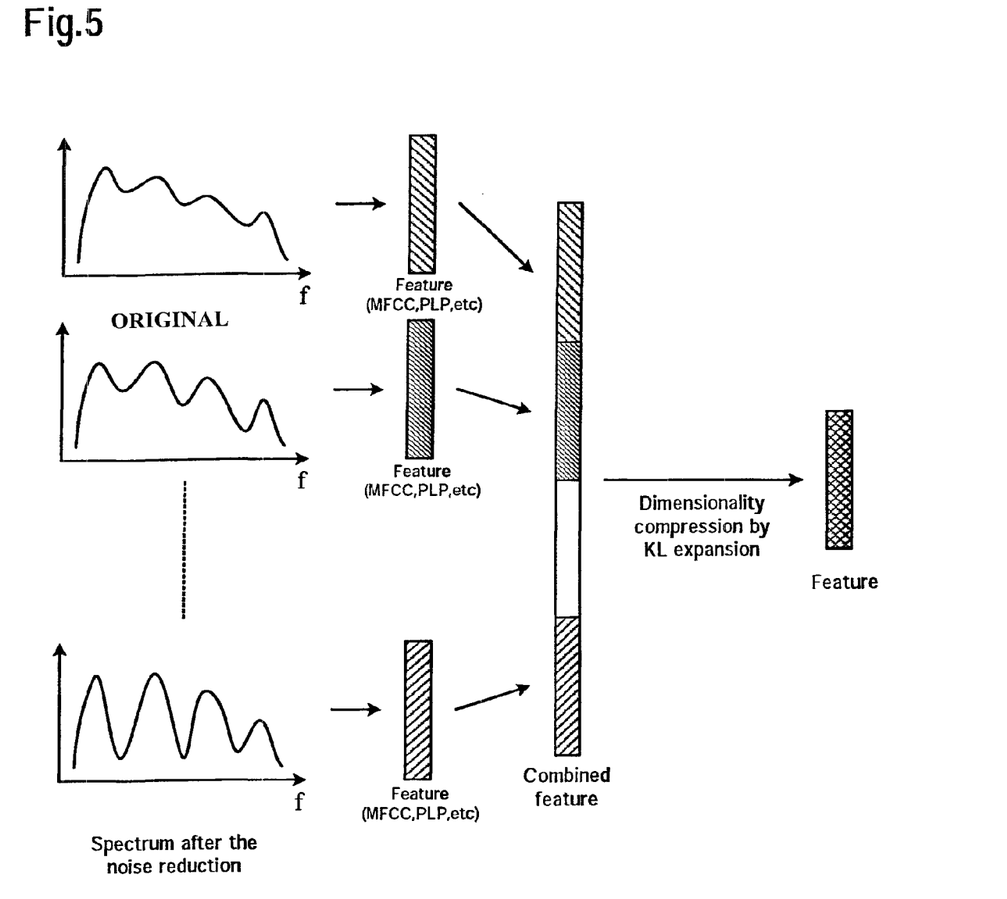
FIG. 5 is an explanatory diagram explaining how to calculate features derived from a plurality of speech spectrums obtained after noise subtraction, and further compressing dimensionality the features by KL expansion.

Various methods of integration are possible, such as changing into MFCC (Mel-Frequency Cepstrum Coefficients) which are cepstrums calculated from the log spectrum resampled on the frequency of Mel-scale after calculating an average spectrum of the noise subtracted frequency spectrums of inputted speech, a PLP (Perceptual Linear Prediction) method which includes the autoregressive all pole model estimated by linear predictive analysis in consideration of the hearing characteristics of human being, shown e.g., in FIG. 4, and a method of compressing into a predetermined dimension the combined feature vector using a dimensional compression method such as KL expansion, as shown e.g., in FIG. 5.

The feature calculated in the feature calculator 104 is inputted into the speech recognition unit 105. The speech recognition unit 105 performs pattern matching between learned standard patterns of speech features accumulated beforehand and the inputted feature, and outputs a recognition result. Possible methods of pattern matching include a statistical/probable pattern recognition method for the time series pattern using the hidden Markov model (HMM), and a method based on the DP matching which is the non-linear pattern matching using a dynamic programming, whereby a change on the time-axis of a speech pattern, etc. can be absorbed.

In the above explanation, as shown in FIG. 2, all the spectrum subtraction units include a noise spectral accumulator 106. However, it is also possible to employ a single commonly used noise spectral accumulator coupled to the plurality of spectral subtraction units and arranged outside of the spectral subtraction unit.

Second Embodiment

Next provided is a detailed description of a second embodiment of the present invention. Although, in the first embodiment, the speech recognition apparatus subtracts noise in each of all the spectral subtraction units in the noise subtraction unit 103 and calculates the speech feature by integrating the subtracted spectrums, a structure in the second embodiment calculates a feature by integrating spectrums including a spectrum in which noise is not at all subtracted in the noise subtraction unit 103.

Figure 3:
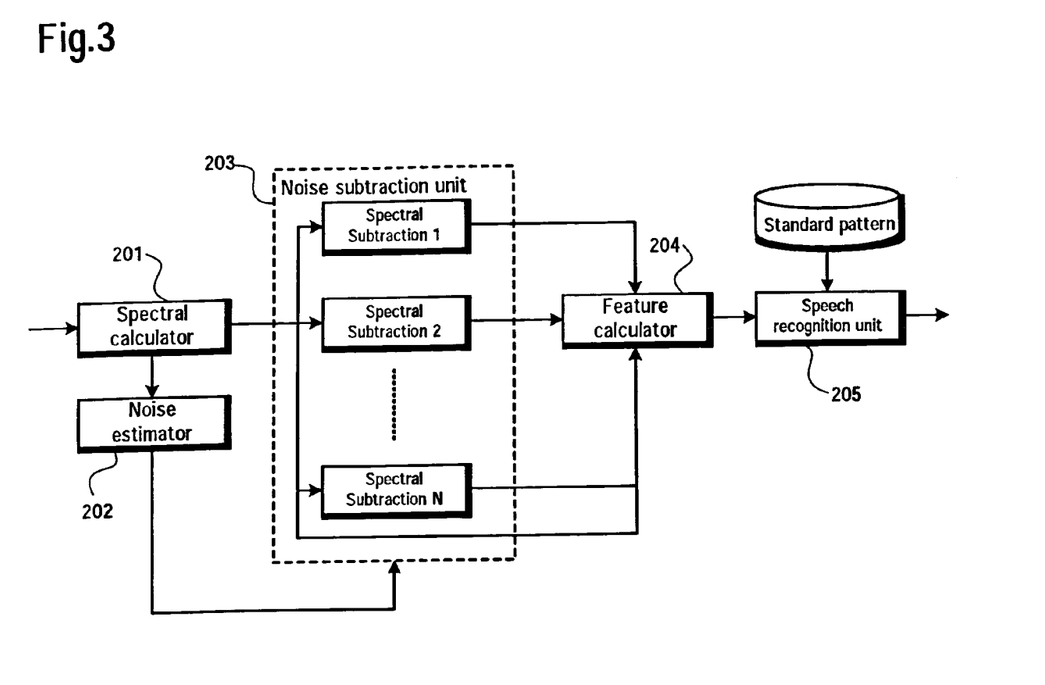
FIG. 3 is a block diagram showing a speech recognition apparatus in an embodiment of the invention.

FIG. 3 is a block diagram of a structure of speech recognition apparatus according to the second embodiment of the present invention. As shown in FIG. 3, the speech recognition apparatus includes a spectrum calculator 201 which calculates a signal spectrum of an inputted speech signal, a noise estimator 202 which estimates a noise spectrum using the signal spectrum calculated by the spectrum calculator 201, a noise subtraction unit 203 which performs a plurality of spectral subtractions at respective differing rates of noise subtraction using the signal spectrum calculated in the spectrum calculator 201 and the noise spectrum estimated in the noise estimator 202, a feature calculator 204 which calculates a feature (vector) for comparison with standard patterns learned beforehand and stored in a speech recognition dictionary by integrating a plurality of the noise-subtracted spectrums output by noise subtraction 203, and a speech recognition unit 205 which recognizes speech by comparing the calculated speech feature calculated in the feature calculator 204 with the standard patterns stored in the speech recognition dictionary.

Here, the feature calculator 204 calculates a feature by integrating a spectrum of inputted speech signal and at least one of the noise-subtracted spectrums. Instead of a plurality of spectrums inputted into the feature calculator 104 as explained in the first embodiment, the feature calculator 204 can operate to extract the speech feature for speech recognition by inputting one or more of the noise-suppressed spectrums and the spectrum inputted speech signal, integrating the inputted spectrums to obtain an average spectrum, and calculating one or more features based on the average spectrum shown, e.g., in FIG. 4. A further alternative method is shown in FIG. 5 and includes calculating at least one feature from each inputted spectrum, and performing dimensional, compression by combining the plural features derived from the inputted spectrums.

Third Embodiment

Figure 6:
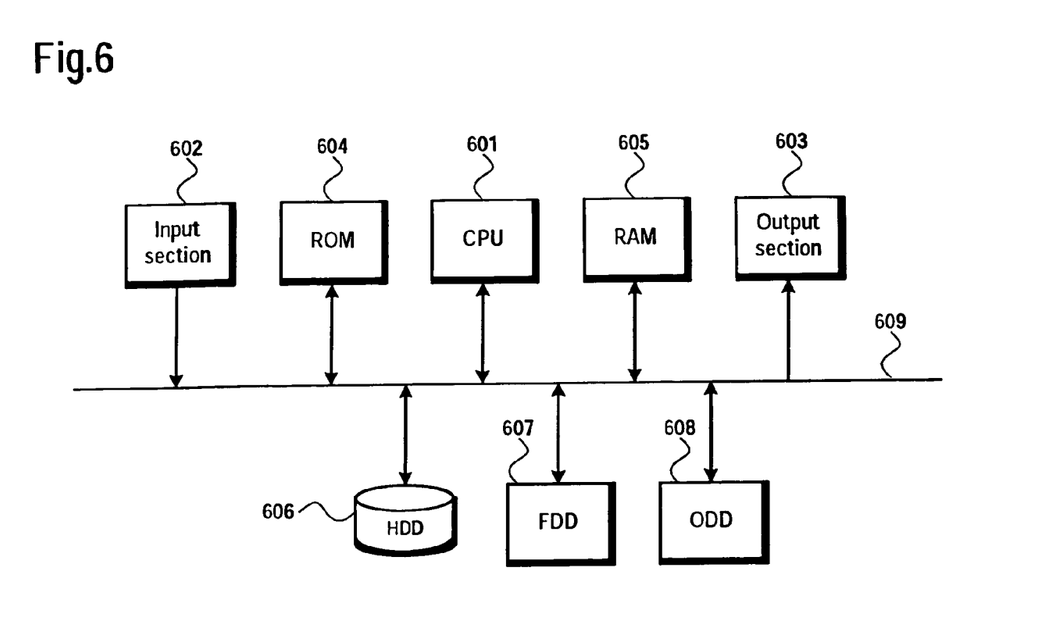
FIG. 6 is a block diagram showing an example of a computer system for realizing the speech recognition method according to the present invention.

A third embodiment of the present invention is next described in detail. FIG. 6 shows the arrangement of a computer system for realizing the speech recognition method according to the present invention. For example, this computer system is a personal computer constituted by a CPU 601 for controlling arithmetic processing, an input section 602 such as a keyboard, a pointing device, or a microphone, an output section 603 such as a display or a loudspeaker, a ROM 604 and a RAM 605 as a main memory, a hard disk unit 606, a floppy disk unit 607, and an optical disk unit 608 as an external memory. These components are connected to each other through a bus 609.

A computer program used to execute the speech recognition processing in the embodiments described above and encoded data are stored in a recording media, which can be a hard disk unit 606, a floppy disk unit 1407, and optical disk unit 608, for example, or any other suitable computer program product, such as RAM, ROM, etc in which the computer program is stored. The CPU 601 performs speech recognition processing for an input speech signal input from the input section 602 in accordance with this program. The resultant data are then output from the output section 603. With this processing, the speech recognition processing of the present invention can be performed using a general personal computer.

Figure 7:
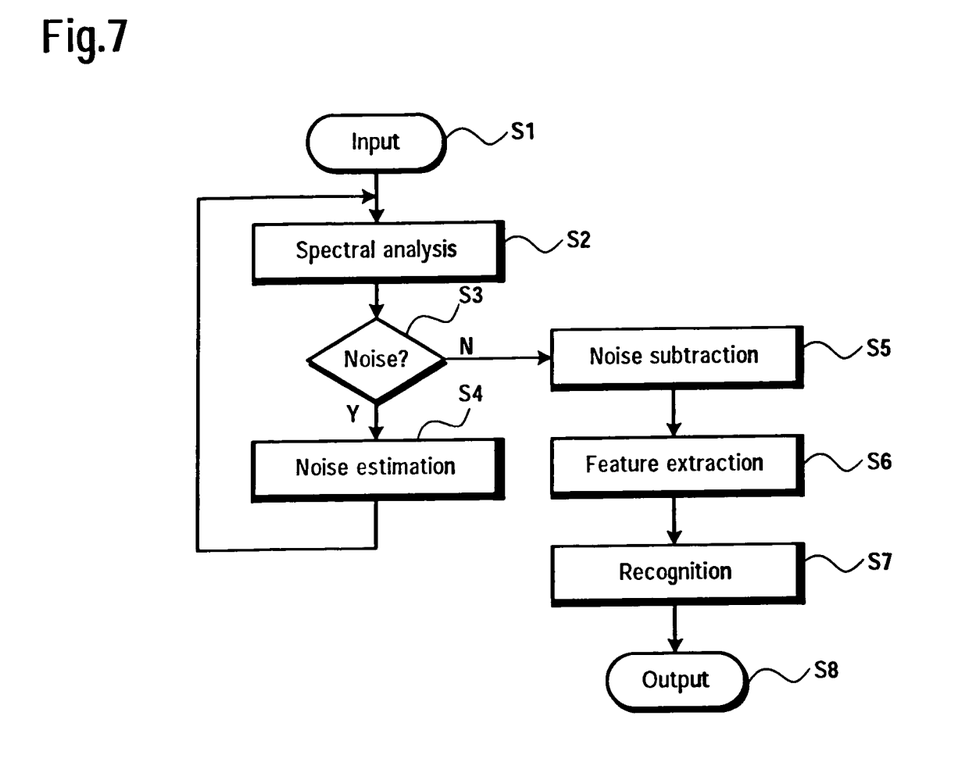
FIG. 7 is a flowchart showing a flow of expansion processing of the embodiment of the invention.

FIG. 7 is a flowchart showing a flow of expansion processing of the third embodiment of the present invention. The above speech recognition method can be variously modified and executed as follows:

A speech signal is first inputted into a speech recognition apparatus (S1). Next, a signal spectrum is calculated by analyzing the inputted speech signal in frequency (S2). It is decided whether the inputted signal is speech or silent (noise) by observing an amplitude or electric power of the inputted speech signal (S3). When the inputted signal is decided as being silent (noise), the spectrum of the silent signal is estimated and memorized as the newest noise spectrum, and spectral calculation (S2) of the following inputted signal is continued (S4).

On the other hand, when the inputted signal is decided as being not silent, i.e. as being an utterance, the noise spectrum is subtracted from the utterance signal spectrum so as to advance for a recognition phase (S5). Specifically, the noise subtraction is performed by subtracting the estimation noise spectrum from the signal spectrum in a plurality of spectral subtractions in which respective differing rates of noise subtraction are employed, using the most recent estimation noise spectrum accumulated beforehand. Next, the feature is calculated using the noise-subtracted spectrums and/or the signal spectrum of the inputted speech before noise subtraction (S6). A speech recognition is performed by matching with the standard pattern of features accumulated beforehand using the calculated feature (S7), and a recognition result is outputted (S8). The above is a flow of the speech recognition processing in the present invention.

Thus, according to the embodiments of the present invention, a plurality of noise-subtracted spectrums obtained at different rates of noise subtraction are utilized in the calculation of features by feature calculator. Therefore, a problem that a recognition performance deteriorates since the rates of noise subtraction defined beforehand does not match with the size of the actual superimposed noise, as in the prior method, is ameliorated. Furthermore, it is unnecessary to adjust the rates of noise subtraction according to the size of the actual superimposed noise by having a plurality of the spectral subtractions at different rates of noise subtraction, and a degree of noise subtraction is adjusted accommodatively, and a problem that a recognition performance deteriorates by the estimated error of the size of noise is also ameliorated.

Numerous variations and modifications are possible in light of the above teachings. It s therefore to be understood that the present invention may be practiced within the scope of the appended claims otherwise then as specifically described herein.

What is claimed is:

1. A speech recognition apparatus comprising:
   at least one computer processing device implementing
      a noise estimation unit configured to estimate a noise spectrum included in an input speech signal;
      a noise subtraction unit configured to subtract the noise spectrum from the input speech signal and output a noise subtracted signal;
      a speech feature extraction unit configured to:
         (i) calculate a first vector that represents a frequency spectrum of the input speech signal,
         (ii) calculate a second vector that represents a frequency spectrum of the noise subtracted signal,
         (iii) combine the first vector and the second vector to obtain a combined vector, and
         (iv) calculate a feature vector by compressing the combined vector into a predetermined dimension; and
      a speech recognition unit configured to perform speech recognition by performing a pattern matching of the feature vector with a standard speech pattern obtained beforehand.

2. A speech recognition method comprising:
   estimating a noise spectrum included in an input speech signal;
   subtracting the noise spectrum from the input speech signal to output a noise subtracted signal;
   calculating a first vector that represents a frequency spectrum of the input speech signal;
   calculating a second vector that represents a frequency spectrum of the noise subtracted signal;
   combining the first vector and the second vector to obtain a combined vector;
   calculating a feature vector by compressing the combined vector into a predetermined dimension; and
   performing speech recognition by performing a pattern matching of the feature vector with a standard speech pattern obtained beforehand.

3. A non-transitory computer-readable medium containing instructions executed by a computer to cause the computer to execute a procedure comprising:
estimating a noise spectrum included in an input speech signal;
subtracting the noise spectrum from the input speech signal to output a noise subtracted signal;
calculating a first vector that represents a frequency spectrum of the input speech signal;
calculating a second vector that represents a frequency spectrum of the noise subtracted signal;
combining the first vector and the second vector to obtain a combined vector;
calculating a feature vector by compressing the combined vector into a predetermined dimension; and
performing speech recognition by performing a pattern matching of the feature vector with a standard speech pattern obtained beforehand.

\* \* \* \* \*